United States Patent

[11] 3,540,597

[72] Inventor Guy Gaudfrin
 67, rue de l'Assomption, Paris, 16° France
[21] Appl. No. 780,398
[22] Filed Dec. 2, 1968
[45] Patented Nov. 17, 1970
[32] Priority Dec. 1, 1967
[33] France
[31] No. 130652

[54] APPARATUS FOR CONTINUOUS FILTERING
 12 Claims, 3 Drawing Figs.
[52] U.S. Cl. .................................................. 210/331,
 210/333;347
[51] Int. Cl. ...................................................... B01d 35/12
[50] Field of Search .......................................... 210/325,
 328, 331, 332, 333, 345, 346, 347

[56] References Cited
 UNITED STATES PATENTS
 945,193 1/1910 Ridgway ...................... 210/331X
 3,056,504 10/1962 Lavallee ........................ 210/328

Primary Examiner—Reuben Friedman
Assistant Examiner—Frank A. Spear, Jr.
Attorney—Karl Ross ABSTRACT: A filtration apparatus with a cylindrical vessel, peripherally subdivided into two symmetrical groups of charging, washing and discharge compartments by radial partitions, accommodates an array of radially extending hollow vanes whose interior is bounded by filter screens and communicates via flexible conduits with a distributor head. The vanes are vertically slidably held in a cage which is rotatable about the vessel axis under the control of a drive mechanism including a set of hoists, one for each partition, which engage an approaching vane and lift it above the associated partition, at the same time executing a limited swing in the direction of vane rotation to advance the array by one step whereby the vane clears the partition before being lowered again; after releasing the engaged vane, the hoist is returned to its starting position ahead of the partition. In each discharge compartment, an abutment intercepts the descending vane to jolt it for the purpose of dislodging adhering solids from its outer surface.

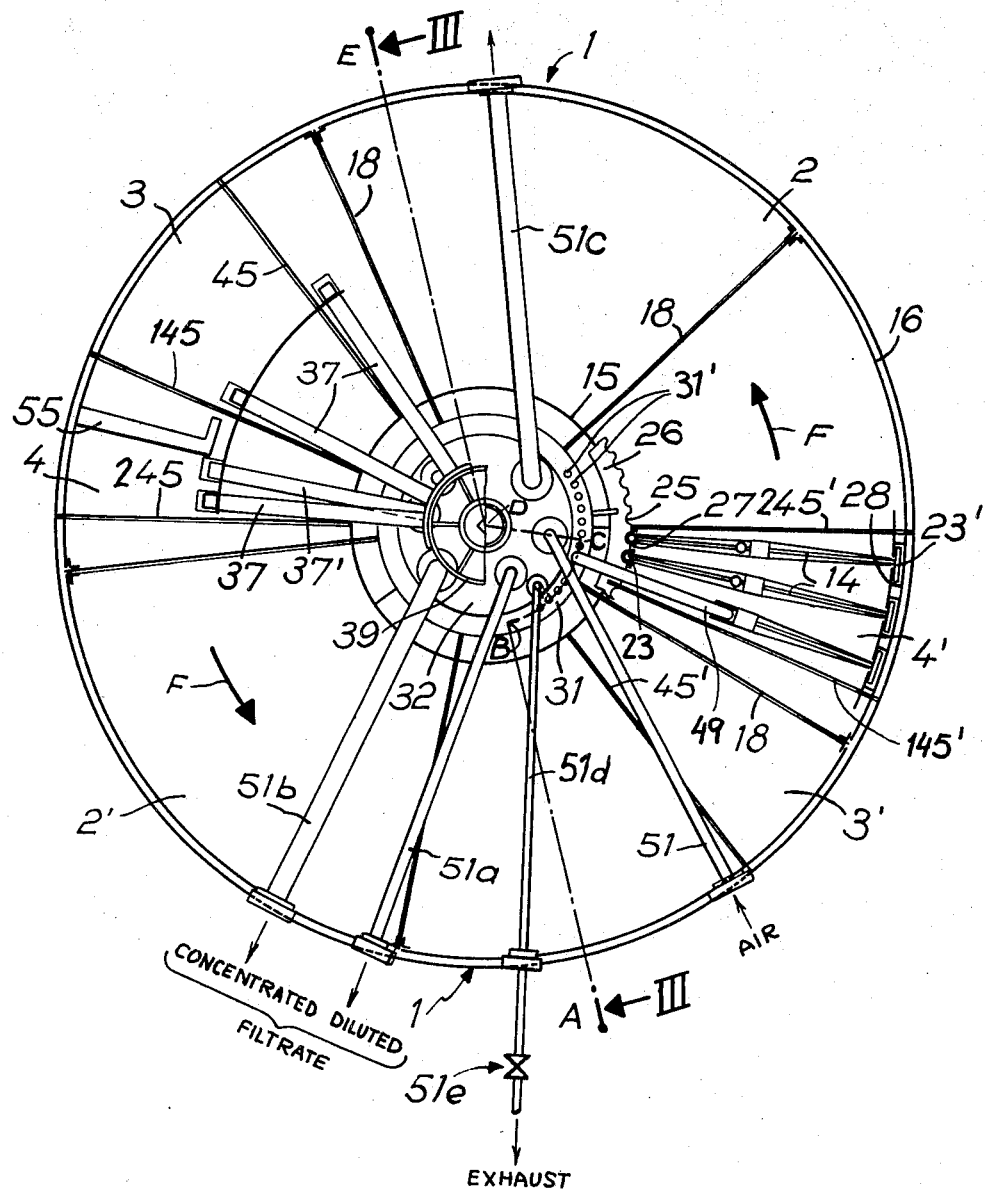

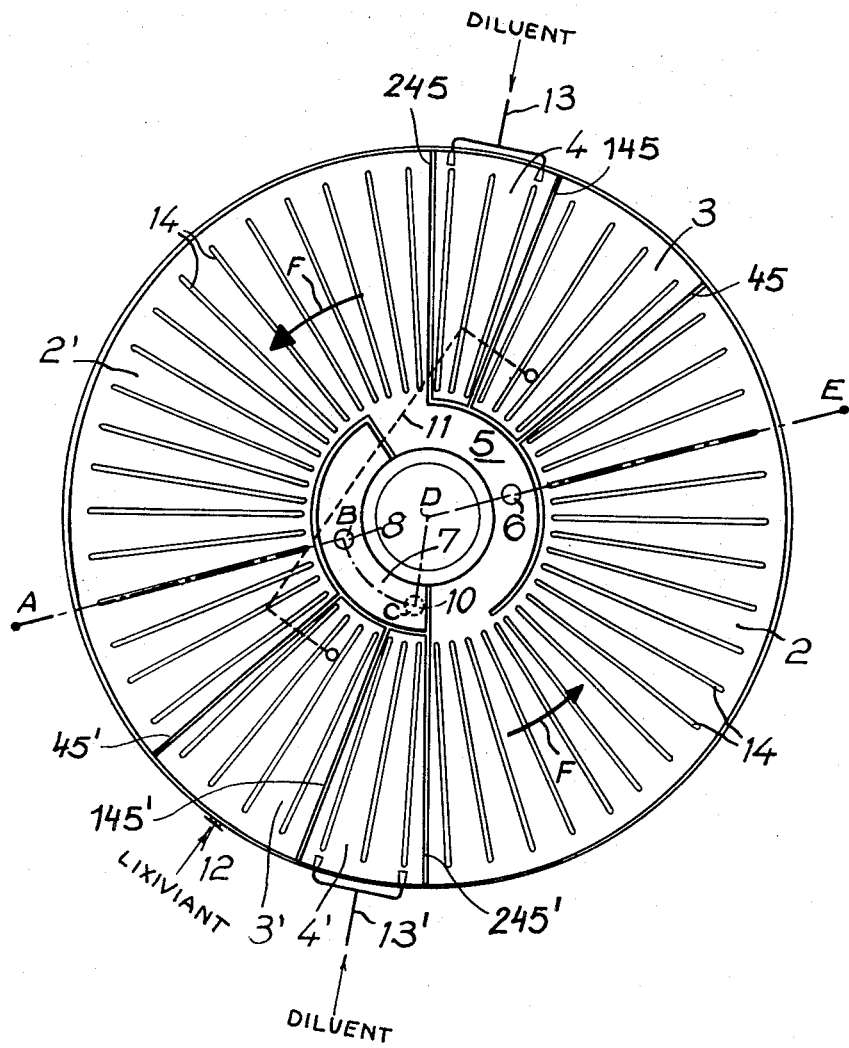

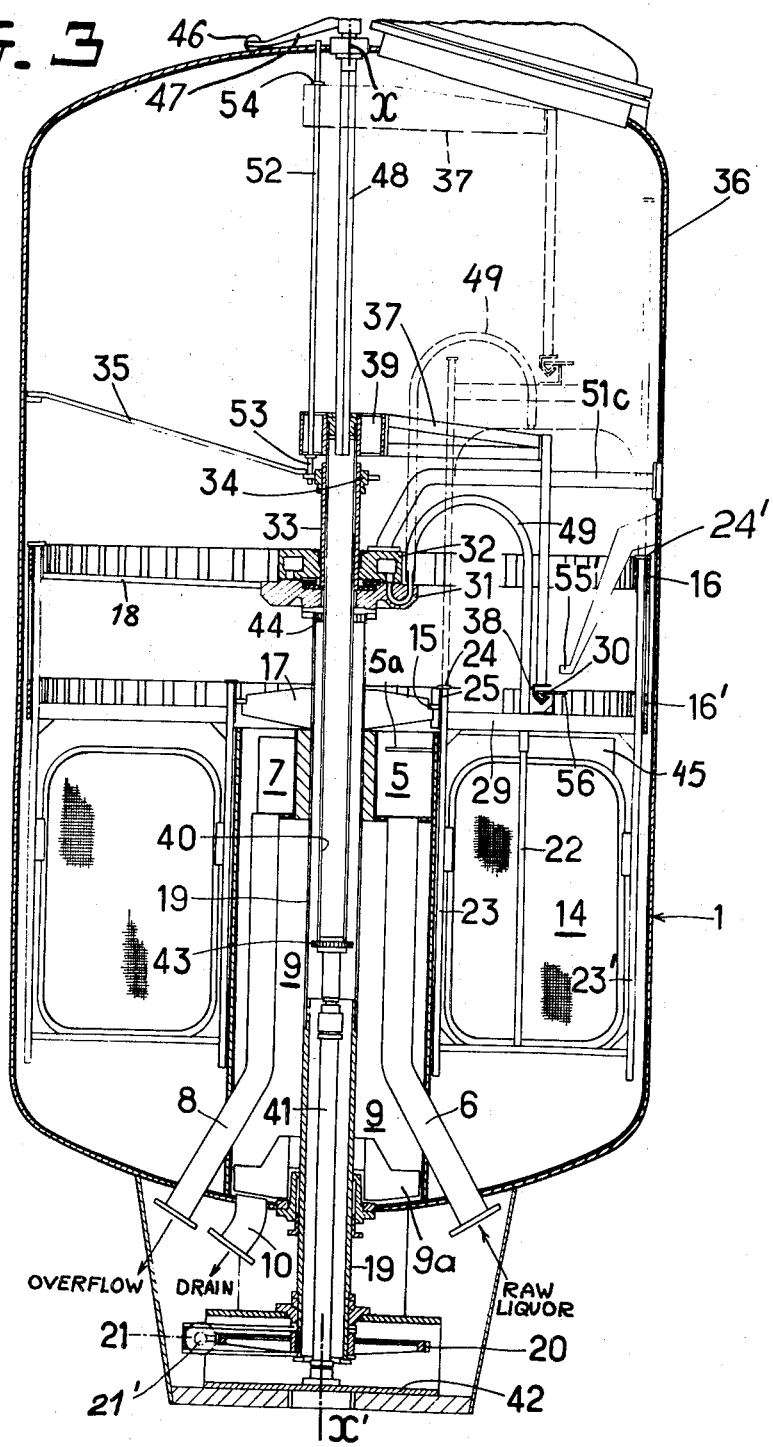

APPARATUS FOR CONTINUOUS FILTERING

My present invention relates to a filtration apparatus to be used in a plant wherein a raw liquor is subjected to successive treatments in different filtering stages, including a first or charging stage, a second or washing stage and a third or discharging stage. In the charging stage, a concentrated filtrate is extracted from the mother liquor via a filter screen; in the washing stage, a lixiviant (e.g. water or highly diluted filtrate) is passed through the filter screen to entrain additional filtrate from a solid residue adhering to the screen surface, this residue or filter cake being dislodged in the discharge stage wherein the pressure differential across the screen is reversed. An installation of this general type has been described, with particular reference to sugar refining, in commonly owned U.S. Pat. No. 3,061,477.

In that earlier system, the filtering elements are in the form of frames spanned on two sides by vertical filter screens, each element being formed as a vane in a radial plane of a common horizontal shaft journaled within an approximately semicylindrical, upwardly open vessel centered on the shaft axis. The rotating vane periodically dips into a mother liquor contained in this vessel which thereby forms the aforedescribed charging compartment; the emerging filter screens are subjected to a washing operation above the liquor level and are then scraped to dislodge the adhering filter cake which tumbles back into the vessel for solubilization and discharge through a drain in the form of a slurry.

A more compact system of the same general type is described in another commonly owned U.S. Pat. No. 3,056,504, wherein the shaft carrying the rotatable vane assembly is vertical and the major surfaces of the vanes, formed by the filter screens, lie in axial planes. (In principle, the system could also operate if only one wall surface of a flat hollow body were formed by a filter screen.) The filtering vessel of this installation, in the form of an upright cylinder, has a bottom drain at a location designed to receive the dislodged residue, the angular spacing of the vanes being increased in the vicinity of this drain to facilitate the dumping of the filter cake. No provision is made for a special washing stage.

The general object of my present invention is to provide an improved filtration apparatus for combining the compactness of a vane assembly with a vertical axis of rotation, pursuant to U.S. Pat. No. 3,056,504, with the possibility of using three discrete stages for filtrate extraction, washing and residue dislodgment; more generally my invention aims at providing a device of this type in which a rotatable array of filtering vanes successively traverses two or more treatment compartments which are sealed off from one another to enable the use of different fluids therein.

This object is realized, pursuant to my present invention, by the provision of an apparatus broadly similar to that of U.S. Pat. No. 3,056,504, i.e. with a substantially cylindrical vessel centered on a vertical axis about which a cage is rotatable, this cage having a set of vanes mounted thereon with freedom of vertical displacement between a normal position in a lower part of the vessel and an elevated position thereabove; this lower part is divided by radial partitions into several compartments concurrently receiving respective groups of vanes, a hoisting mechanism serving to lift each vane across an intervening partition upon transition from one compartment to the next. The interior of each vessel communicates with a fixed distributor head through a flexible conduit which is connected to different channels of the head in different rotary positions of the cage for the purpose of discharging an effluent or receiving a purging fluid.

Advantageously the interior of the vessel is maintained under air of constant superatmospheric pressure, reference in this connection being made to my copending U.S. Pat. application Ser. No. 780,389 of even date which describes and claims the combination of a compressor for maintaining such constant air pressure with a set of adjustable throttles in the outlets from the several compartments for establishing varying pressure differentials across the filter screens of the vanes temporarily located in these compartments.

According to a more specific feature of my present invention, the hoisting mechanism comprises an axially, i.e. vertically, slidable assembly with a plurality of lifting arms, at least one per compartment, which overhang the respective partitions with freedom of limited swinging about the axis of the array, the raising, forward swinging and lowering of the assembly occurring at timed relationship with the drive of the cage which unidirectionally rotates the array of vanes about the axis for consecutive filtrate extraction, washing and cleaning in a continuous operation.

According to a preferred embodiment, the drive of the cage includes a pair of nested, axially extending elongated members, as such as two telescoped shafts, one of which is intermittently rotated and normally decoupled from the assembly of lifting arms, the other member being rigid with that assembly and being vertically slidable along the first member to elevate the vanes by engagement thereof with hook-shaped lower ends of the arms while rotation is imparted to the assembly of arms in their raised position through the interengagement of coacting formations (such as meshing sets of teeth) on the two members. After the second member has been lowered again, together with the hoisting assembly, and thereby decoupled from the intermittently stepped member, a restoring device acts upon the assembly to swing it back through the same angle by which it had been swung forwardly together with the elevated vanes, thereby resetting each lifting arm to its original position just ahead of an associated partition. Since the rotary cage positively interconnects all the vanes for joint rotation, the swinging of the vanes engaged by the lifting arms advances the entire array by one step, advantageously through an arc corresponding to a uniform angle of separation between adjoining vanes.

The hoisting assembly may also include one or more auxiliary lifting arms disposed in the discharge compartment for the purpose of raising a further vane or vanes adjacent a vane just entering that compartment, thereby affording additional clearance for the dislodgment of filter cake from the entering vane; such dislodgment, according to a further feature of my invention, may be effected by interrupting the descent of the vane with the aid of an abutment positioned to intercept that vane and to release it only after further rotation of the array, thus causing the vane to return with a jolt to its normal bottom position.

In a particularly advantageous embodiment, the several above-enumerated compartments (charging, washing and discharge) are duplicated symmetrically about the axis of rotation, with like compartments of the two groups lying at diametrically opposite locations. Since, as a rule, the several compartments of each group are of different angular extent, with the charging compartment generally the largest, this symmetrical arrangement helps balance the hoisting assembly apart from increasing the capacity of the system.

The above and other features of my invention will become more fully apparent from the accompanying drawing in which:

FIG. 1 is a top plan view of a treatment vessel and associated elements forming part of a filtration apparatus according to the invention;

FIG. 2 is a partly diagrammatic top plan view of an array of vanes received within the vessel of FIG. 1, only a small segment of this array being illustrated in the preceding FIG.; and FIG. 3 is a sectional elevational view taken on the line III—III of FIG. 1, this line passing through points A, B, C, D, E in FIGS. 1 and 2.

The apparatus shown in the drawing comprises a generally cylindrical treatment vessel 7 having a closed envelope 36 centered on a vertical axis $x-x'$ (FIG. 3). The lower part of this vessel is divided into six compartments symmetrically disposed about the axis, i.e. two diametrically opposite charging compartments 2, 2', two somewhat smaller washing compartments 3, 3' and two still smaller discharge compartments 4, 4'. These compartments are mutually separated, in a fluid-tight manner, by radial partitions 45, 45', 145, 145', 245, 245'. It will be noted that compartments 2 and 2' extend over arcs of approximately 130° each, compartments 3, 4 together accounting for about 50°.

As best seen in FIG. 2, partitions 245 and 245' have arcuate inner extensions forming a nearly semiannular inlet chamber 5, communicating with compartments 2 and 2', and an overload chamber 7 of closed horizontal outline also extending over an almost semiannular ring sector; raw liquor is supplied to chamber 5 through an inlet tube 6 whose discharge port is spacedly overlain by a splash disk 5a (omitted in FIGS. 1 and 2) whereas overload chamber 7 is provided with an outlet tube 8 for draining off excess filtrand or wash water. Compartments 3 and 3', isolated from the remaining compartments, are interconnected (e.g. at their bottoms) by a conduit diagrammatically indicated at 11 in FIG. 2 and receive water or some other lixiviant through an inlet 12 opening into compartment 3'. Compartments 4, 4', also isolated from all the others, open downwardly into a central duct 9 underlying the ring chambers 5 and 7; this duct also contains a rotary agitator or chopper 9a, of the general type disclosed in the prior U.S. patents referred to above, for mixing dislodged filter cake together with a diluent into a slurry to be discharged via a drain 10; the diluent is admitted into compartments 4 and 4' via inlets 13, 13' (FIG. 2). An array of peripherally equispaced vanes 14, each having a flat hollow body with at least one and preferably two major wall surfaces formed by filter screens, extend radially with reference to axis x–x' and are supported in a rotatable cage formed by an inner ring 15 and two vertically spaced outer rings 16, 16'. Radial stays 17 support the ring 15 on a tubular shaft 19 which also carries a disk-shaped collector plate 31 and is connected with ring 15 via other radial stays 18; similar stays (not shown), aligned with the stays 18, interconnect the rings 15 and 16'. Thus, the shaft 19, the collector 31 and the rings 15, 16 and 16' together form a unitary structure rotatable about the container axis x–x'. This cage is unidirectionally rotated by a drive mechanism diagrammatically represented by a ratchet wheel 20 keyed to the lower end of shaft 19 projecting from envelope 36, the ratchet wheel being periodically stepped by a pawl 21' at the end of the piston of a hydraulic or pneumatic cylinder 21 of the double-acting type to which fluid is periodically admitted to reciprocate its piston, thereby advancing the cage by one tooth division of ratchet 20 corresponding to the angular separation of vanes 14. The drive 20, 21 is accommodated in a base 42 which may also include means not shown for connecting the pipes 6, 8 and 10 to respective conduit extensions. Agitator 9a is seated on shaft 19 for rotary entrainment thereby.

Collector plate 31 has a multiplicity of orifices 31', FIG. 1, from which flexible conduits 49 of gooseneck shape extend to respective vanes 14 where these conduits are joined to vertical tubes 22 which open at their bottom into the interior of the associated vanes. The frame of each vane is rigid with a pair of rods 23, 23' interconnected by horizontal cross braces 29 and respectively received in seats 25 and 28 on the inner and outer cage peripheries, seats 25 being notches in an annulus 26 rigid with inner ring 15 whereas seats 28 are defined by slots between peripherally spaced lugs rigid with rings 16 and 16'. These seats enable a vertical displacement of vane 14 from a normal lower position, beneath the tops of partitions 45 etc., and an elevated position above these partitions as illustrated in full and dot-dash lines in FIG. 3; each vane 14, however, has an invariable angular position relative to cage 15, 16, 16' and is additionally separated from adjoining vanes by spacers 27 to ensure the geometric stability of the array. Conduits 49 are long enough to permit such raising and lowering of the filtering members 14 for the purpose of clearing the partitions 45 etc. in their passage from one compartment to the next; during the short period in which the vanes are elevated, enough liquid generally remains between the filter screens thereof to keep the tubes 22 at least partly filled, thereby preventing the discharge of air from the vessel by way of these conduits. Heads 24 and 24' at the upper ends of rods 23, 23' limit the descent of the vanes by coming to rest on the rings 15 and 16, respectively.

Collector plate 31 is overlain by a fixed distributor head 32 on a sleeve 33 which is braced with reference to envelope 36 by rods 35. Head 32 has several downwardly open channels, as shown in the aforementioned U.S. Pat. No. 3,056,504, which successively communicate with the orifices 31' and lead to a system of pipes 51, 51a etc. shown in FIG. 1. Pipe 51, communicating with compartments 4 and 4' through the filter screens of the vanes positioned therein, is connected to a source of air (not shown) at a pressure higher than that prevailing in the upper part of envelope 36 for the purpose of clearing adherent solids from the filter screens. Pipe 51a and a symmetrical pipe not shown, communicating similarly with compartments 3 and 3', receive diluted filtrate from the conduits 49 of the vanes being washed by the lixiviant present therein. Pipes 51b and 51c receive the concentrated filtrate from compartments 2' and 2, respectively. Pipe 51b and a companion pipe, not shown, connect the interior of any vane 14 with the atmosphere by way of a throttle 51e whenever that vane clears the partition 45 or 45', thereby establishing a reduced pressure differential across the filter screens preparatorily to a reversal of that differential in compartments 4 and 4' so as to avoid the formation of cracks in the adhering filter cake which in the following discharge stage would impair the efficiency of the purging air stream from pipe 51; adjustment of throttle 51e enables the control of the extent to which residual filtrate in the conduits 49 may be expelled via pipe 51d. Similar throttles may be provided at the outlets of pipes 51a, 51b and 51c to control the pressure differentials in a manner more fully described in my copending application of even date; float-type level-stabilizing means may also be provided, in addition to overflow trough 7, in compartments 2, 2' and 3, 3' to maintain a substantially constant liquid volume therein.

I shall now describe in detail the means whereby the vanes 14 are elevated upon approaching the partitions 45 etc. and are lowered after clearing these partitions.

The angular separation of adjoining vanes 14, while being a small fraction of the width of any compartment, is greater than the width of any partition and corresponds to the range of angular mobility of a collar 39 fixed to the upper end of a tubular shaft 40 which is telescopingly received in shaft 19 and is vertically slidable along axis x–x', being guided for that purpose by a vertical rod 48 of noncircular (e.g. square) profile matingly received in the bore of collar 39. Rod 48 projects upwardly through envelope 36 and is secured to a lever 47 controlled by the piston of a hydraulic or pneumatic jack 46 which, in contradistinction to jack 21, need not be double-acting. Collar 39 is integral with a set of lifting arms 37, of generally inverted L-shape, lying in radial planes adjacent respective partitions 45, 145 etc. and terminating just above these partitions in hook-shaped lower ends 38 adapted to engage, from below, mating formations 30 on the cross brace 29 of any vane 14; these formations 30 have substantially conical downwardly directed points receivable in complementary depressions of the hooks 38 for a positive alignment of the vanes 14 and the arms 37. Another fluid-operated jack 41, extending axially within shaft 19, bears from below upon shaft 40 to elevate it, together with collar 30 and the arms 37 secured thereto, by a distance sufficient to raise every vane 14 engaged by these arms to the elevated position shown in dot-dash lines in FIG. 3; a pinion 43 on the lower end of shaft 40 then meshes with a complementary ring gear 44 at the upper end of shaft 19 whereby the two shafts are coupled for joint rotation as the shaft 19, through its driving gear 20, is unidirectionally stepped in a counterclockwise sense (FIGS. 1 and 2) as indicated by arrows F. Thus, the assembly of lifting arms 37 and elevated filtering vanes 14 is swung in that direction by one step, i.e. through the angle of separation of the vanes, whereupon jack 41 is lowered to let the assembly return to its normal position and to redeposit the previously raised vanes in the next compartments. This operation disengages the toothed coupling elements 43 and 44 from each other, thereby enabling the jack 46 to rotate, through its lever 47, the rod 48 with shaft 40 and lifting arms 37 clockwise (against the direction of arrows F) to their previous position without entrainment of any filtering vane, the actuation of jack 46 being properly timed to occur after the hooks 38 have released the overhanging lugs 30 of the vanes.

In order to expedite the dislodgment of filter cakes from the screens of the vanes, I prefer to provide on each vane—advantageously as an extension of its lug 30—a spur 56 positioned to be intercepted by an abutment 55 or 55' fixed to the inner wall of envelope 36 at the inlet side of compartment 4 or 4', respectively. As the vane 14 descends after clearing the partition 145 or 145', it is stopped somewhat above its bottom position by the interengagement of elements 55 (or 55') and 56, being released only in the next cycle as the cage 15, 16, 16' rotates through a further step. In that next cycle, therefore, the intercepted vane drops to the bottom with a jolt which, conjointly with the effect of the high-pressure air admitted through its conduit 49, clears the adherent solids from its outer screen surfaces.

In order to provide additional room for the dislodged solids, I prefer to employ at least one auxiliary lifting arm 37' above each compartment 4 and 4' in a position adjacent that occupied by a vane being jolted in the manner just described. Thus, the auxiliary arm 37 raises an immediately preceding vane and redeposits it in the compartment only after the succeeding vane has dropped from the abutment 55 or 55'.

Although the apparatus shown and described operates most effectively with superatmospheric air pressure in the upper part of its vessel 1, it could also be filled with air at substantially atmospheric pressure in which case a partial vacuum would have to be connected to the outlet ends of pipes 51a, 51b, 51c and 51d. In this event, naturally, the envelope 36 need not be sealed against the outer atmosphere.

The system herein disclosed may be used not only in sugar refining but also in the extraction of a variety of juices from vegetable and animal matter.

I claim:

1. A filtration apparatus comprising a substantially cylindrical vessel centered on a vertical axis; a cage mounted in said vessel for rotation about said axis; a set of vanes each having a flat hollow body disposed in an axial plane of said vessel and provided with a filter screen on at least one major vertical surface, said vanes being mounted on said cage with freedom of vertical displacement between a normal position in a lower part of said vessel and an elevated position above said lower part; a plurality of radial partitions in said vessel dividing said lower part into several compartments concurrently receiving respective groups of said vanes; a fluid collector axially disposed on said cage; flexible conduits extending from said collector to said vanes and terminating at the interior thereof for communication with the surrounding compartments through the respective filter screens; a distributor head fixedly disposed in said vessel adjacent said fluid collector and provided with channels communicating with said conduits in different rotary positions of said cage; drive means for progressively rotating said cage in said vessel; and hoist means synchronized with said drive means for lifting each of said vanes into said elevated position upon the approach of any of said partitions and returning said vanes to said normal position upon transition to an adjoining compartment across the intervening partition.

2. An apparatus as defined in claim 1 wherein said hoist means comprises an axially slidable assembly with a plurality of arms respectively overhanging said partitions with freedom of limited swinging about said axis, and mechanism for raising and lowering said assembly, each of said arms having a hook-shaped lower end engageable from below with a complementary formation of any of said vanes.

3. An apparatus as defined in claim 2 wherein said vanes are peripherally equispaced in said cage with an angle of separation corresponding to a fraction of the narrowest of said compartments but exceeding the width of any of said partitions, said drive means comprising an oscillatory system effective in a raised position of said assembly so step same through said angle of separation in a predetermined direction of rotation, together with the vanes engaged thereby, and operative in a lowered position of said assembly to rotate same in the opposite direction by the same angle upon release of said engaged vanes from said arms.

4. An apparatus as defined in claim 3 wherein said oscillatory system includes a first reciprocable element normally decoupled from said assembly, coupling means including a unidirectional transmission operatively connecting said first element with said assembly in said raised position thereof for stepping same through said angle of separation, and a second reciprocable element permanently coupled with said assembly for rotating same in said opposite direction in said lowered position thereof.

5. An apparatus as defined in claim 4 wherein said drive means includes a pair of nested elongate members journaled in said vessel along said axis, one of said members being coupled with said first element through said unidirectional transmission, the other of said members being rigid with said assembly and axially slidable along said one of said members while being positively coupled with said second element for rotation thereby, said coupling means further including complementary formations on said members coacting in a raised position of said other of said members for rotatively entraining same in said predetermined direction.

6. An apparatus as defined in claim 2 wherein said compartments include a relatively large compartment adapted to receive a liquid to be filtered and a relatively small compartment provided with a drain for solid residue, the conduits of the vanes in said large compartment communicating through said head and certain of said channels with a region of pressure lower than that in said vessel whereby said liquid is forced inwardly through said filter screen, the conduits of the vanes in said small compartment communicating through said head and other of said channels with a source of fluid at a pressure higher than that in said vessel whereby adhering residue is dislodged from the outside of said filter screen and dumped into said drain.

7. An apparatus as defined in claim 6 wherein said compartments are duplicated symmetrically about said axis.

8. An apparatus as defined in claim 6, further comprising abutment means at the upstream side of said small compartment positioned to intercept a coacting part of a vane descending from its elevated position into said small compartment and to let the intercepted vane drop to its normal position upon further rotation thereof, thereby jolting the vane to help dislodge said adhering residue.

9. An apparatus as defined in claim 8 wherein said assembly includes at least one further arm in said small compartment positioned to elevate a vane adjacent said descending vane to give the latter added clearance for dislodged residue.

10. An apparatus as defined in claim 6 wherein said compartments include a further compartment for a lixiviant between said large and small compartments, the conduits of the vanes in said further compartment communicating through said head and certain of said channels with a region of pressure lower than that in said vessel whereby said lixiviant is forced inwardly through said filter screen together with residual filtrate from adhering solids.

11. An apparatus as defined in claim 10 wherein at least one of said channels is provided with a restricted outlet to the atmosphere, said one of said channels communicating through said head with the conduit of any vane transiting from said large compartment to said further compartment.

12. An apparatus as defined in claim 1 wherein each of said conduits is provided with a generally vertical extension opening into the interior of the respective vane near the bottom of said body.